US010339130B2

(12) United States Patent
Taylor et al.

(10) Patent No.: US 10,339,130 B2
(45) Date of Patent: Jul. 2, 2019

(54) DIVERSE ADDRESSING OF GRAPH DATABASE ENTITIES BY DATABASE APPLICATIONS

(71) Applicant: Microsoft Technology Licensing, LLC, Redmond, WA (US)

(72) Inventors: John Anthony Taylor, Bellevue, WA (US); Christopher Lee Mullins, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 352 days.

(21) Appl. No.: 15/287,620

(22) Filed: Oct. 6, 2016

(65) Prior Publication Data
US 2018/0101559 A1   Apr. 12, 2018

(51) Int. Cl.
| G06F 16/22 | (2019.01) |
| G06F 16/23 | (2019.01) |
| G06F 16/28 | (2019.01) |

(52) U.S. Cl.
CPC ...... *G06F 16/2365* (2019.01); *G06F 16/2228* (2019.01); *G06F 16/23* (2019.01); *G06F 16/2379* (2019.01); *G06F 16/28* (2019.01)

(58) Field of Classification Search
CPC .......... G06F 17/3056; G06F 17/30365; G06F 17/30607
See application file for complete search history.

(56) References Cited

U.S. PATENT DOCUMENTS

| 7,970,745 | B2 | 6/2011 | Norcott |
| 8,214,401 | B2 | 7/2012 | Rao et al. |
| 9,110,970 | B2 | 8/2015 | Mohan |
| 9,785,725 | B2 * | 10/2017 | Srinivasan ........ G06F 17/30554 |

(Continued)

FOREIGN PATENT DOCUMENTS

WO   2015047073 A1   4/2015

OTHER PUBLICATIONS

Todd Williams, Gregory, "Supporting Identity Reasoning in SPARQL Using Bloom Filters", In Proceedings of the Workshop on Advancing Reasoning on the Web: Scalability and Commonsense, Jun. 2, 2008, 11 pages.

(Continued)

*Primary Examiner* — William Spieler
(74) *Attorney, Agent, or Firm* — Michael Best & Friedrich LLP

(57) ABSTRACT

A facility for addressing nodes in a graph database is described. The facility receives from a first application a first indication that it treats a first property as a unique identifier, and receives from a second application distinct from the first application a second indication that it treats a second property distinct from the first property as a unique identifier. The facility receives from the first application a first update request for a distinguished entity, the distinguished entity identified in the first update request by its value for the first property. The facility performs the first update request with respect to the distinguished entity. The facility receives from the second application a second update request for the distinguished entity, the distinguished entity identified in the second update request by its value for the second property. The facility performs the second update request with respect to the distinguished entity.

19 Claims, 12 Drawing Sheets

(56) References Cited

U.S. PATENT DOCUMENTS

| | | | |
|---|---|---|---|
| 2010/0036862 A1* | 2/2010 | Das | G06F 17/3033 707/698 |
| 2010/0049728 A1 | 2/2010 | Chiticariu et al. | |
| 2010/0174692 A1 | 7/2010 | Meyer et al. | |
| 2012/0102022 A1* | 4/2012 | Miranker | G06F 17/30569 707/713 |
| 2014/0172914 A1* | 6/2014 | Elnikety | G06F 17/30958 707/774 |
| 2014/0279837 A1* | 9/2014 | Guo | G06F 17/30589 707/603 |
| 2014/0324915 A1 | 10/2014 | Gkoulalas-Divanis et al. | |
| 2015/0100873 A1 | 4/2015 | Lahr | |
| 2015/0281011 A1 | 10/2015 | Gates et al. | |
| 2015/0347620 A1* | 12/2015 | Cai | G06F 17/30914 707/809 |
| 2016/0012051 A1* | 1/2016 | Zoryn | G06F 17/30864 707/739 |
| 2016/0055184 A1 | 2/2016 | Fokoue-Nkoutche et al. | |
| 2016/0063037 A1* | 3/2016 | Savkli | G06F 17/30277 707/722 |
| 2016/0063271 A1* | 3/2016 | Bartlett | G06F 17/30091 726/28 |

OTHER PUBLICATIONS

Gearon et al., "SPARQL 1.1 Update", Retrieved from <<https://www.w3.org/TR/2013/REC-sparql11-update-20130321/>> Mar. 21, 2013, 28 Pages.

Evertsson, Simon, "Accelerating Graph Isomorphim Queries in a Graph Database Using the GPU", Retrieved From <<https://uu.diva-portal.org/smash/get/diva2:1056415/FULLTEXT01.pdf>> Aug. 2016, 50 Pages.

Lausen, Georg, "Relational Databases in RDF: Keys and Foreign Keys", In Proceedings of Semantic Web, Ontologies and Databases, Sep. 24, 2007, 14 Pages.

Muchandi, Veer, "Sharing a Database Across Applications", Retrieved from <<https://blog.openshift.com/sharing-database-across-applications/>> Feb. 10, 2015, 8 Pages.

"International Search Report and Written Opinion Issued in PCT Application No. PCT/US2017/054649", dated Dec. 6, 2017, 12 Pages.

* cited by examiner cross-reference table — 600

| InverseFunctionalProperty | value | internal id |
|---|---|---|
| email | Vfox@aol.com | 123456 |

611 — 612 — 613 — 601

*FIG. 6* cross-reference table — 900

| InverseFunctionalProperty | value | internal id |
|---|---|---|
| email | VFox@aol.com | 123456 |
| employee_id | 96547 | 123456 |

911 — 912 — 913 — 901, 902

*FIG. 9* cross-reference table — 1100

| InverseFunctionalProperty | value | internal id |
|---|---|---|
| email | VFox@aol.com | 123456 |
| employee_id | 96547 | 123456 |
| email | Vinod@msn.com | 345678 |

┌─ 1300
                          cross-reference table

| InverseFunctionalProperty | value          | internal id |
|---------------------------|----------------|-------------|
| email                     | VFox@aol.com   | 123456      |
| employee_id               | 96547          | 123456      |
| email                     | Vinod@msn.com  | 345678      |
| employee_id               | 71236          | 567890      |

┌─ 1600
                          cross-reference table

| InverseFunctionalProperty | value          | internal id |
|---------------------------|----------------|-------------|
| email                     | VFox@aol.com   | 123456      |
| employee_id               | 96547          | 123456      |
| email                     | Vinod@msn.com  | 345678      |
| employee_id               | 71236          | 345678      |
| internal id               | 567890         | 345678      |

DIVERSE ADDRESSING OF GRAPH DATABASE ENTITIES BY DATABASE APPLICATIONS

BACKGROUND

Triplestores and subject-predicate-object databases store "triples" each representing a relationship between a pair of things. For example, such a database may contain the triple (Sandra, manages, Anthony). In this example, "Sandra" is the subject of the triple, "manages" is the predicate of the triple, and "Anthony" is the object of the triple. The triple represents a relationship between Sandra and Anthony in which Sandra is Anthony's manager.

Graph databases organize information by connecting pairs of nodes each with an edge. A graph database can be used to represent the contents of a triplestore or subject-predicate-object database; in particular, each triple is represented by establishing a first node corresponding to the subject of the triple, establishing a second node corresponding to the object of the triple, and establishing an edge from the first node to the second node corresponding to the predicate of the triple. In some cases, graph databases are used to represent the values of properties for entities: a first node represents an entity, such as a particular book; an edge exiting the first node represents a property identity, such as a title property; and a second node entered by the edge represents a value of the property represented by the edge for the entity represented by the first node, such as the title of the book represented by the first node.

Graph databases, subject-predicate-object databases, and triplestores have many similarities; can be used in many of the same situations; and can often be straightforwardly transformed between each other. They are favored for their flexibility, able to dynamically consume and organize data of arbitrary complexity without requiring that a structure be defined for the data in advance of its loading.

One common way in which the contents of the source of databases mentioned above are updated by client applications is by submitting HTTP Post and Patch requests that identify entities or subjects in the database to update based upon identifiers such as URIs assigned by the database to the entities or subjects.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for addressing nodes in a graph database is described. The facility receives from a first application a first indication that it treats a first property as a unique identifier, and receives from a second application distinct from the first application a second indication that it treats a second property distinct from the first property as a unique identifier. The facility receives from the first application a first update request for a distinguished entity, the distinguished entity identified in the first update request by its value for the first property. The facility performs the first update request with respect to the distinguished entity. The facility receives from the second application a second update request for the distinguished entity, the distinguished entity identified in the second update request by its value for the second property. The facility performs the second update request with respect to the distinguished entity.

BRIEF DESCRIPTION OF THE DRAWINGS

FIG. 6 is a table diagram showing sample contents of the cross-reference table in response to receiving request 1.

FIG. 9 is a table diagram showing sample contents of the cross-reference table in response to receiving request 3.

FIG. 11 is a table diagram showing sample contents of the cross-reference table in response to receiving request 6.

FIG. 13 is a table diagram showing sample contents of the cross-reference table in response to receiving request 7.

FIG. 16 is a table diagram showing sample contents of the cross-reference table to receiving request 10.

DETAILED DESCRIPTION

Figure 1:
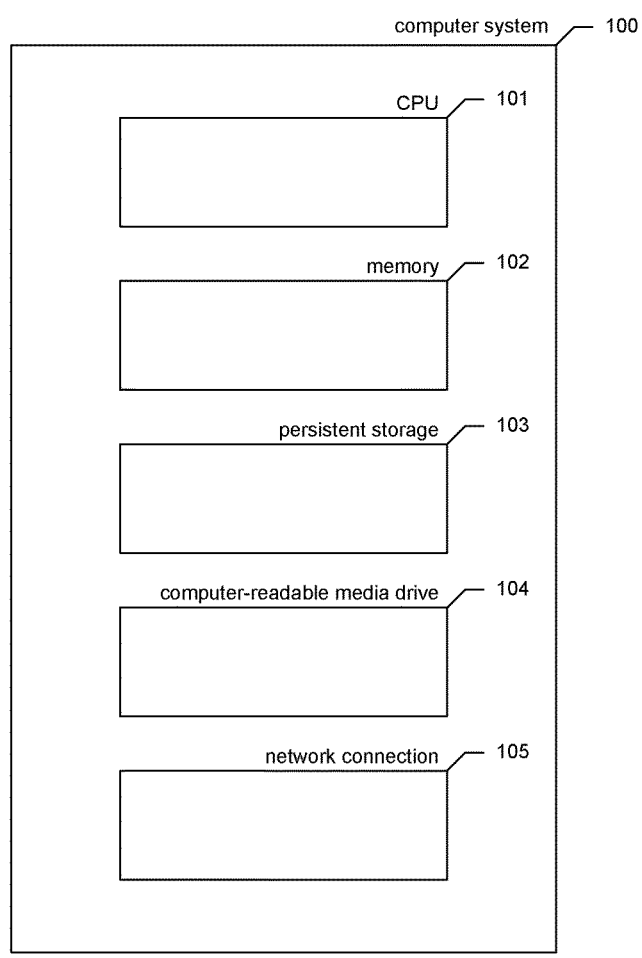
FIG. 1 is a block diagram showing some of the components typically incorporated in at least some of the computer systems and other devices on which the facility operates.

The inventors have recognized that requiring clients of graph databases, subject-predicate-object databases, and triplestores to identify entities or subjects in the database for updating using identifiers for those entities or subjects assigned by the database creates significant disadvantages. As one example, an entity or subject being created or updated in the database by the client is already represented in the data model of the client. In establishing these representations, the client creates its own identifiers for them. To be able to formulate entity or subject update requests for submission to the database, the client must maintain and apply a mapping between the database's identifiers for entities or subjects and the client's representations of these entities or subjects. Then, when formulating such an update request, the facility must apply the mapping to the client's identifiers for the involved entities or subjects to obtain the database's identifiers for these entities or subjects, then include the database's identifiers in the update request. This process imposes extra storage and processing burdens upon the application, and adds complexity to its operation. Also, several factors may make it difficult or impossible to extend the application's data model and/or processing in the ways needed. Further, in some situations, the application may not have all the information needed to maintain the accuracy of these mappings.

To ameliorate these disadvantages observed by the inventors in the conventional approach to updating entities and subjects discussed above, they have conceived and reduced to practice a software and/or hardware facility to enable diverse addressing by database applications of entities in graph databases and/or subjects in subject-predicate-object databases or triplestores ("the facility"). To simplify the discussion herein, graph databases, subject-predicate-object databases, triplestores, and databases of other similar are referred to hereafter as "graph databases," or simply as "databases." For the same reason, both properties of entities and predicates of subjects are referred to hereafter as "properties." Client applications are referred to variously as "database clients," "clients," or "applications."

In some embodiments, the facility allows any application seeking to access the entities in a graph database to do so using the application's own identifiers, without (1) having to know or track the identifiers assigned to the entities by the graph database, or (2) having to know or track identifiers used by other applications to access these entities. For example, in a graph database in which each entity represents a person, each entity may have properties such as the employee's email address, fax number, employee ID number, and allergens. A first application can refer to a particular entity in this database by the value of its email property, while a second application can refer to a particular entity by the value of its employee ID number property. These "inverse functional properties"—the email and employee ID number properties—can be used by applications to identify entities in the database for purposes such as reading an existing entity, updating an existing entity, or creating a new entity, and are different from the internal identifiers used by the database to identify entities. Being able to refer to entities using identifiers other than the database's internal identifiers frees applications of any need to know or track those internal identifiers. The facility maintains a list of inverse functional properties ("IFPs"), each a property stored in the database that is used by at least one application to uniquely identify entities. Once a particular property is on the list of inverse functional properties, a client can submit an update request does not specify a value of the database's internal identifier for the entity to be updated, but instead refers to a particular entity by a value of the inverse functional property.

When the facility receives such an update request on behalf of the database, it consults a cross-reference table that it maintains to map from the combination of an inverse functional property and its value to the database's internal identifier for the entity having that value of the inverse functional property. If the cross-reference table contains such a mapping, the facility causes the database to apply the update request to the entity identified by the internal identifier in the mapping. If the cross-reference table does not contain such a mapping, the facility (1) causes the database to create a new entity which is assigned a new internal identifier, (2) causes the database to apply the update request to the created entity, and (3) adds to the cross-reference table a mapping from the inverse functional property and value specified for it by the update request to the internal identifier assigned to the created entity.

In some embodiments, the facility monitors update requests to identify situations in which multiple entity nodes in the database correspond to a single entity representation in use by an application. In such situations, the facility merges or otherwise reconciles these multiple entity nodes in the database, including, if necessary, updating the cross-reference table to reflect the reconciliation.

In some embodiments, the facility maintains multiple versions of sets of rules governing its operation, such as sets of rules establishing inverse functional properties, and/or governing the reconciliation of related entity nodes. An application can elect a particular version of such rules, such as by providing a standing election that is applied until replaced or revoked, or by providing per-request elections that are applied only for the duration of the request in which they are included. In various embodiments, in electing in particular rule set version, an application can refer to the rule set version by a version number of the version, and effective time at which the version was created or updated, etc. This allows an application whose logic supports existing rules but may not support future rules to ensure the compatibility of the application with the rules applied by the facility on its behalf.

By performing some or all of the ways described above, the facility reduces the overhead imposed on database clients to update entities in graph databases; and/or permits different clients to update the same entity using their own, different native identifiers to identify that entity.

Also, by performing in some or all of the ways described above and storing, organizing, and/or accessing information relating to a database in an efficient way, the facility meaningfully reduces the hardware resources needed to store and exploit this information, including, for example: reducing the amount of storage space needed to store the information relating to the database; and reducing the number of processing cycles needed to store, retrieve, or process the information relating to the database. This allows programs making use of the facility to execute on computer systems that have less storage and processing capacity, occupy less physical space, consume less energy, produce less heat, and are less expensive to acquire and operate. Also, such a computer system can respond to user requests pertaining to information relating to a graph database with less latency, producing a better user experience and allowing users to do a particular amount of work in less time.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
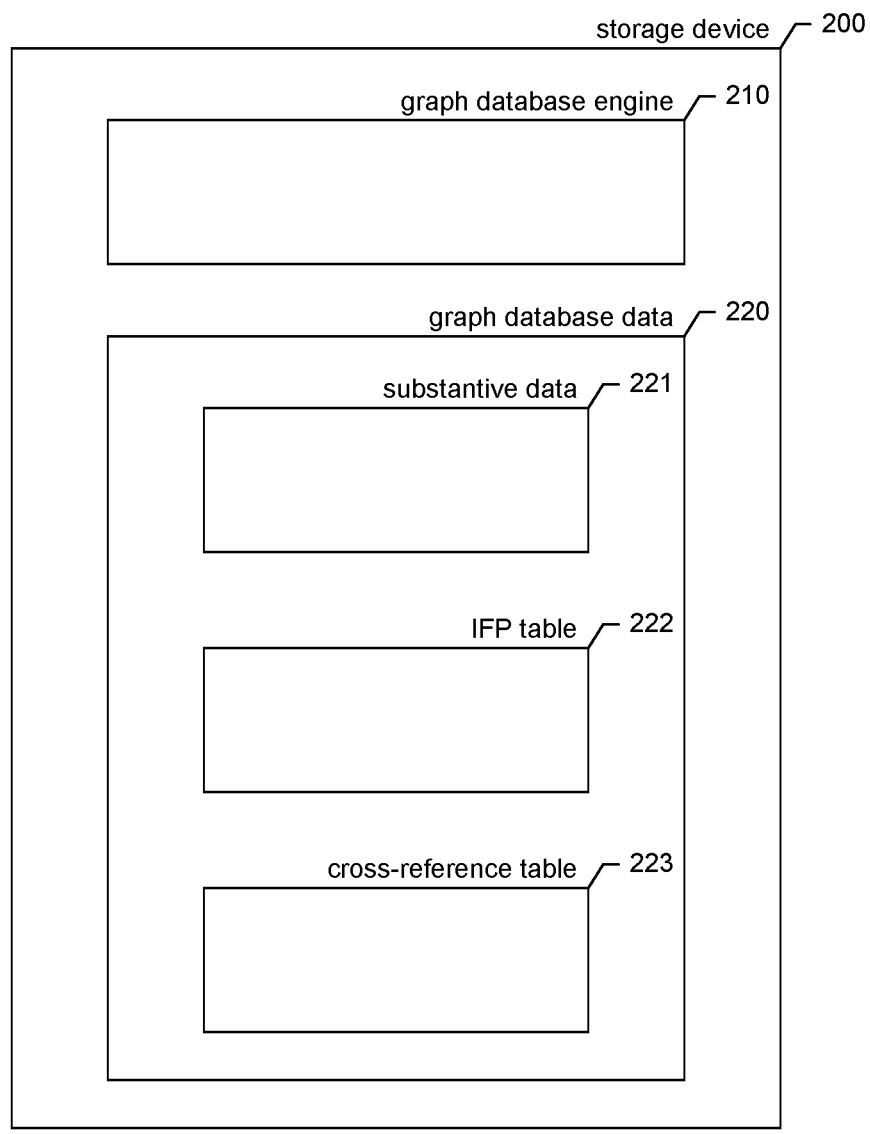
FIG. 2 is a storage diagram showing data and code stored by the facility in some embodiments.

FIG. 2 is a storage diagram showing data and code stored by the facility in some embodiments. A storage device 200—such as memory 102, persistent storage 103, or media accessed via a computer readable media drive 104—stores an engine 210 and data 224 for a graph database or a database of another similar type. The graph database data includes substantive data 221 stored natively by the database—such as substantive graphs, triples, or other representations; an inverse property table 222; and a cross-reference table 223. In some embodiments (not shown), the facility stores the inverse property table and/or the cross-reference table outside the graph database data, and/or manages one or both of these tables using code other than the graph database engine. In various embodiments, the facility is implemented as part of the graph database engine, separately from the graph database engine, only partially within the graph database engine, etc.

Figure 3:
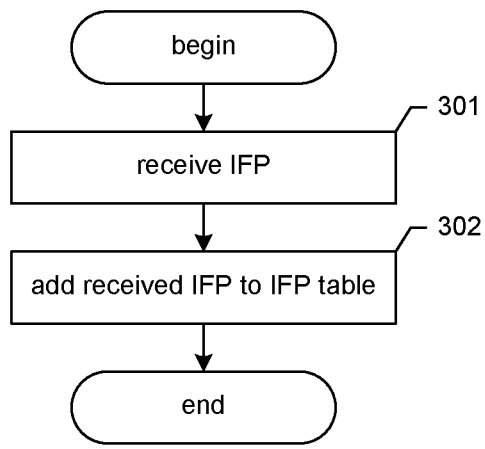
FIG. 3 is a flow diagram showing the process performed by the facility in some embodiments to add an inverse functional property to the list of inverse functional properties maintained by the facility.

FIG. 3 is a flow diagram showing a process performed by the facility in some embodiments to add an inverse functional property to the list of inverse functional properties maintained by the facility. In act 301, the facility receives an inverse functional property, such as from an application. In act 302, the facility adds the inverse functional property received in act 301 to an inverse functional property table or other list of inverse functional properties. After act 302, this process includes. In some embodiments (not shown), the facility permits other changes to the list of IFPs, such as the removal of IFPs from the list.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

In one example of the operation of the facility discussed below, the facility receives an "email" IFP from a first application, "application A," and receives an "employee_ID" IFP from a second application, "application B." The facility stores these two received IFPs in an IFP table that maintains, shown below in Table 1.

TABLE 1

| IFP table |
|---|
| email |
| employee_id |

The IFP table shown in Table 1 above is part of an example of the operation of the facility continues in Tables 2-20 below.

Figure 4:
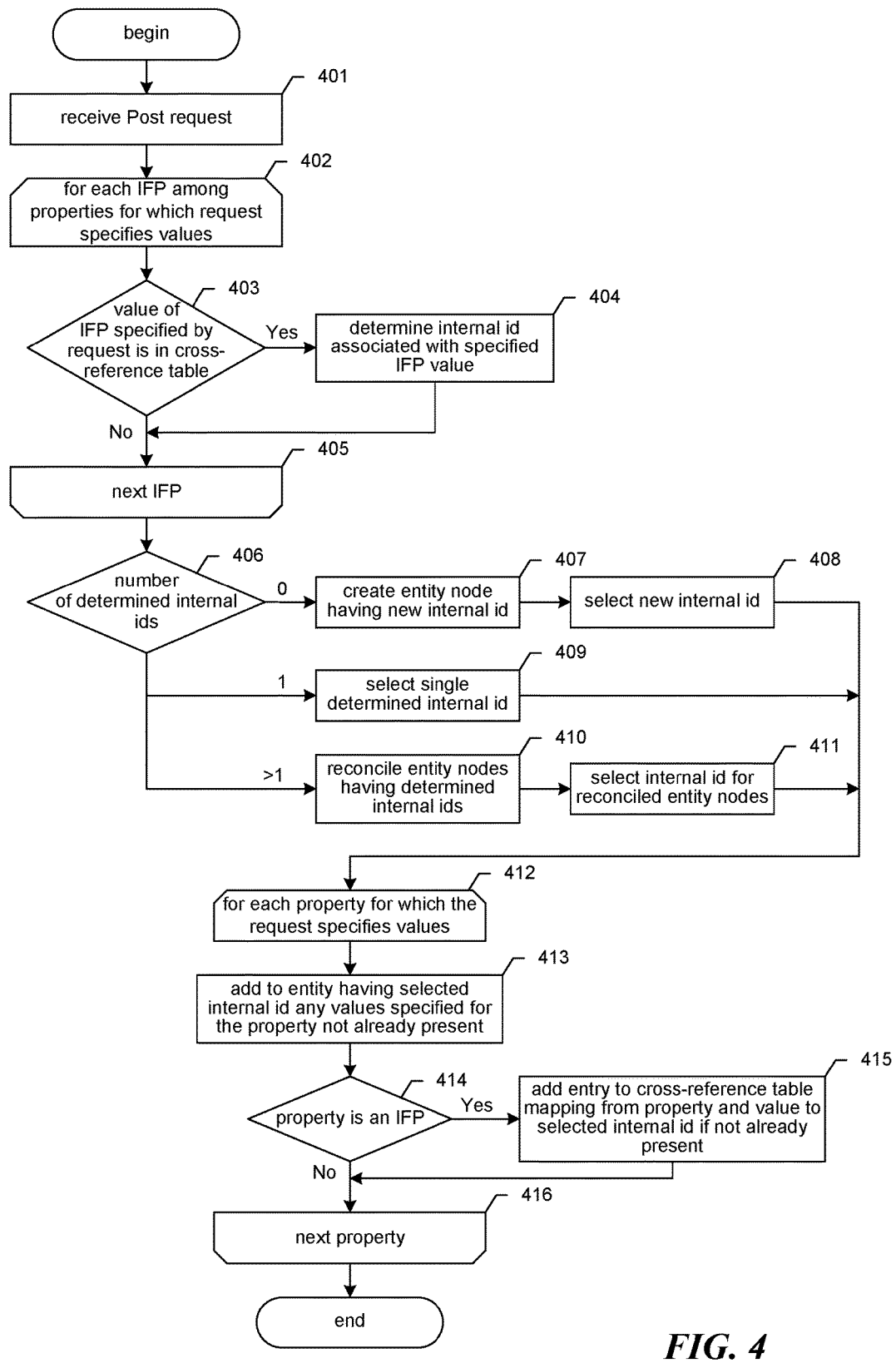
FIG. 4 is a flow diagram showing a process performed by the facility in some embodiments to process a Post request.

FIG. 4 is a flow diagram showing the process performed by the facility in some embodiments to process a Post request. In act 401, the facility receives a Post request specifies one or more values for each of one or more properties, such as a Post request submitted by an application. In some embodiments, the facility performs this process only for Post requests that do not contain an internal identifier identifying the entity to be updated, and handles Post requests that do contain an internal identifier identify the entity to be updated in a conventional manner. In various embodiments, the facility performs this process for entity update requests other than Post requests, which can include, for example, Patch requests.

In acts 402-405, the facility loops through each IFP that is among the properties for which the request received in act 401 specifies one or more values. The facility identifies these IFPs by consulting the IFP table. In act 403, if the cross-reference table contains a mapping for the combination of the current IFP and the value specified for the current IFP by the request, then the facility continues in act 404, else the facility continues in act 405. In act 404, the facility determines the internal ID in that mapping. In act 405, if additional IFPs remain to be processed, then the facility continues in act 402 to process the next IFP, else the facility continues in act 406.

In act 406, the facility switches on the number of determined internal IDs: where the number is zero, the facility continues in act 407; where the number is one, the facility continues in act 409; where the number is greater than one, the facility continues in act 410. In act 407, where the number of determined internal IDs is zero, the entity referenced by the request does not exist in the database, so the facility creates a new entity node in the database having a new internal ID. In act 408, the facility selects that new internal ID for further processing. After act 408, the facility continues in act 412. In act 409, where the number of determined internal IDs is one, that single internal ID identifies the only entity node in the database that corresponds to the entity referenced by the request, so the facility selects this internal ID for further processing. After act 409, the facility continues in act 412. In act 410, where the number of determined internal IDs is greater than one, two or more entity nodes in the database identified by these internal IDs correspond to the entity referenced by the request, so the facility reconciles these entity nodes. In act 411, the facility selects for further processing an internal ID for the entity nodes reconciled in act 410. The internal ID selected in act 411 can be one of the internal IDs determined in act 404, or can be an internal ID not determined in act 404.

In acts 412-416, the facility loops through each property for which the request specifies one or more values, including both properties that are IFPs and those that are not IFPs. In act 413, the facility adds to the entity having the internal ID selected in act 408, 409, or 411 any values specified for the property by the request that are not already present in this entity. For update requests that are not Post requests, the facility updates the property of the entity in a manner consistent with the type of the request. For example, for Patch requests, in some embodiments, the facility substitutes the values of the property specified by the request rather than adding them if not already present. In act 414, if the current property is an IFP, then the facility continues in act 415, else the facility continues in act 416. In act 415, the facility adds an entry to the cross-reference table that maps from the property value specified for the current property by the request to the selected internal ID if such an entry is not already contained by the cross-reference table. In act 416, if additional properties remain to be processed, then the facility continues in act 412 to process the next property, else this process concludes. In some embodiments (not shown), when the Post request received in act 401 specifies property values for multiple database nodes, the facility loops through acts 402-416 for each such node.

Table 2 below shows a first update request ("Request 1") received by the facility from application A at the time when the IFP table has the contents shown above in Table 1, and the cross-reference table and the database content are both empty.

TABLE 2

Request 1: Post by Application A

```
Post
{
    email: "VFox@aol.com",
    fax: "206-323-1414"
}
```

This update request specifies values for an email property and a fax property. In performing the process shown in FIG. 4 for this request, in act 402, the facility determines by comparing the properties in the request to the properties contained in the IFP table shown in Table 1 that the email property in the request is an IFP, and the fax property is not. in acts 403-404, the facility determines that the empty cross-reference table does not contain the value "VFox@aol.com" for the email IFP, indicating that the entity referenced by the request is not in the database. Accordingly, in acts 406-407, the facility creates a new entity node. In act 413, the facility adds to the new entity node email and fax properties having the values specified by the request.

Figure 5:
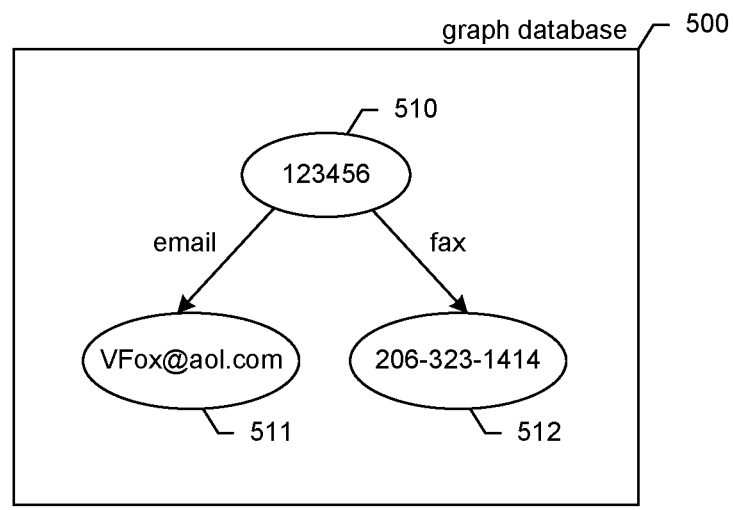
FIG. 5 is a graph diagram showing sample contents of the graph database in response to receiving request 1.

FIG. 5 is a graph diagram showing sample contents of the graph database in response to receiving request 1. The diagram shows that the graph database 500 contains a new entity node 510 having the internal ID "123456". In some embodiments (not shown), internal IDs, rather than being of the form "123456", are URIs or identifiers of other types. The entity node has two property nodes: an email property node 511 containing the value "VFox@aol.com", and a fax property node containing the value"206-323-1414".

In act 415, in response to receiving request 1, the facility adds an entry to the cross-reference table that maps the value of "VFox@aol.com" for the email property to the created entity node.

FIG. 6 is a table diagram showing sample contents of the cross-reference table in response to receiving request 1. The cross-reference table 600 contains a single row 601 corresponding to a mapping from the combination of an IFP and its value to the internal ID of the entity node that is identified by that value for that IFP value. The facility added row 601 to the cross-reference table in response to receiving request 1. The row is divided into the following columns: an IFP column 611 contain the mapped-from IFP; a value column 612 containing the mapped-from value for this IFP; and an internal ID column 613 containing the mapped-to internal ID of the entity node having this value of the IFP. In particular, row 601 indicates that entity node 510 shown in FIG. 5, identified by internal ID "123456", can also be identified by applications by the "VFox@aol.com" value of the email property.

While FIG. 6 and each of the table diagrams discussed below show a table whose contents and organization are designed to make it more comprehensible by a human reader, those skilled in the art will appreciate that actual data structures used by the facility to store this information may differ from the table shown, in that they, for example, may be organized in a different manner; may be indexed in various ways; may contain more or less information than shown; may be compressed and/or encrypted; may contain a much larger number of rows than shown, etc.

Figure 7:
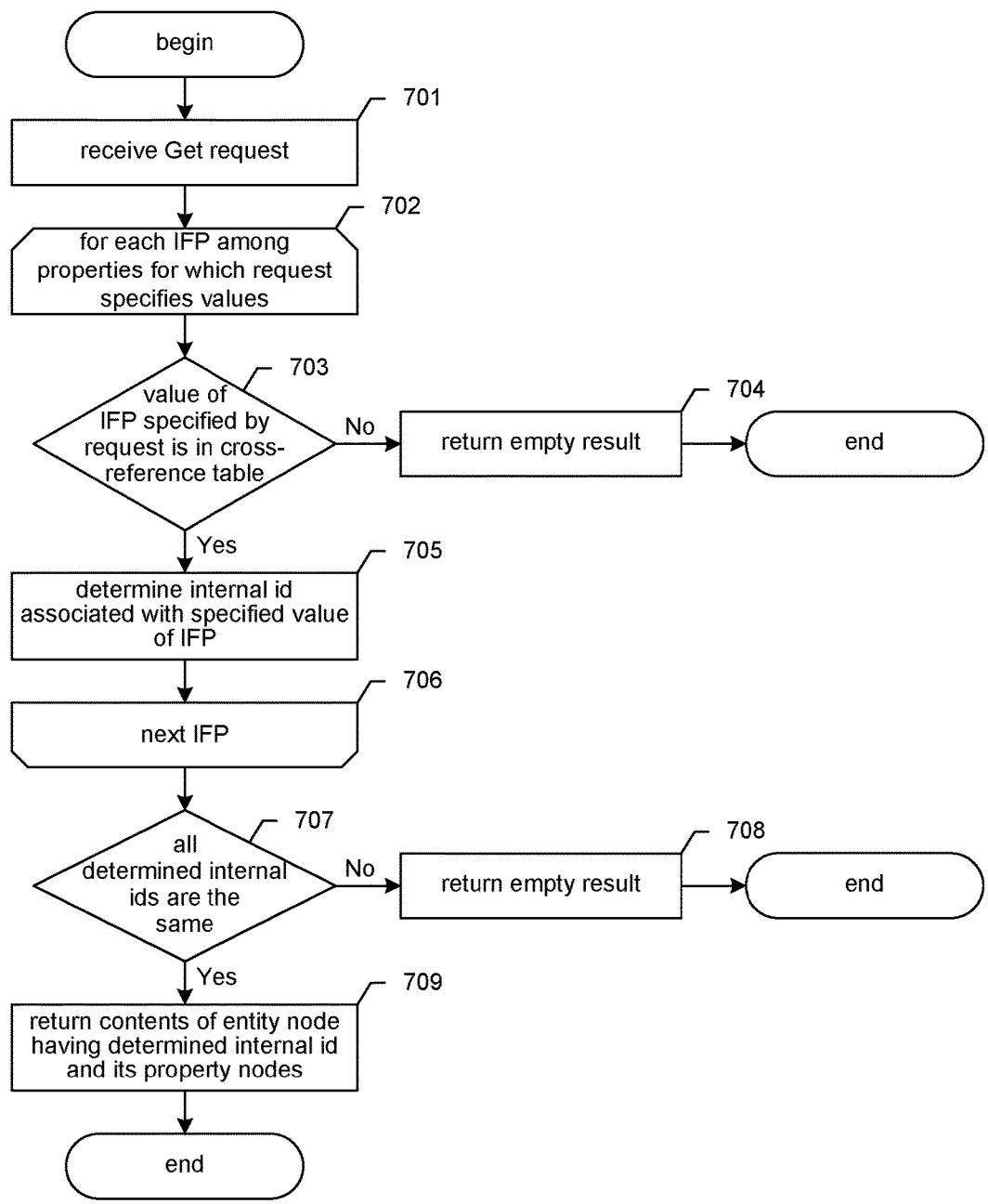
FIG. 7 is a flow diagram showing a process performed by the facility in some embodiments to process a Get request.

In addition to submitting update requests, applications can submit Get requests to return the internal ID and all property values for an entity node identified by internal ID or by the value of any IFP. FIG. 7 is a flow diagram showing a process performed by the facility in some embodiments to process a Get request. In act 701, the facility receives a Get request identifying an entity to be returned by internal ID or by that value of any IFP. In acts 702-706, the facility loops through each IFP that is among the properties for which the Get request received in act 701 specifies values. In act 703, if the value of the current IFP is in the cross-reference table, then the facility continues in act 705, else the facility continues in act 704. In act 704, because no entity node will fully match the request, the facility returns an empty result in response to the request. After act 704, this process concludes. In act 705, the facility determines the internal ID associated with the specified value of the current IFP in the entry of the cross-reference table that contains the specified value of the IFP. In act 706, if additional IFPS remain to be processed, then the facility continues in act 702 to process the next IFP, else the facility continues in act 707. In act 707, if all of the internal IDs determined in act 705 are the same, then the facility continues in act 709, else the facility continues in act 708. In act 708, because the IFP values specified by the request are not all contained by the same entity node, the facility returns an empty result. After act 708, this process concludes. In act 709, the facility returns the contents of the entity node having the internal ID determined in act 705, and the contents of the property nodes attached to the entity node. After act 709, this process concludes.

Table 3 below shows a Get request submitted by application A at a time after the update request shown in Table 2 above is received and processed.

TABLE 3

Request 2: Get by Application A

```
Get
{
    email: "VFox@aol.com"
}
```

This Get request specifies the value "VFox@aol.com" for the email property. In performing the process shown in FIG. 7 for the Get request in act 703, the facility finds the value of the email IFP specified by the request in row 601 of the cross-reference table shown in FIG. 6. Thus, in act 704, the facility determines the internal ID "123456" occurring in the cross-reference table at the intersection of 601 with internal ID column 613. Because in act 707 there is only single determined internal ID, the facility continues in act 709 to return the contents of entity node 510 and property nodes 511 and 512.

Table 4 below shows the response to request 2 shown in Table 3 above.

TABLE 4

Response to Request 2

```
{
    id: "123456",
    email: "VFox@aol.com",
    fax: "206-323-1414"
}
```

The response contains the internal ID stored in entity node 510, and values stored in property nodes 511 and 512 for the email and fax properties, respectively. In some embodiments, the facility returns some or all of the information in Table 4 automatically in response to the update request shown in Table 2, rendering the explicit request in Table 3 redundant and unnecessary.

Table 5 below shows a further update request received from application B.

TABLE 5

Request 3: Post by Application B

Post
{
    employee_id: "96547",
    email: "VFox@aol.com"
}

The request contains the same value for the email IFP as request 1. The request further specifies a value for an employee_ID property, which as shown in Table 1 above is also an IFP.

Figure 8:
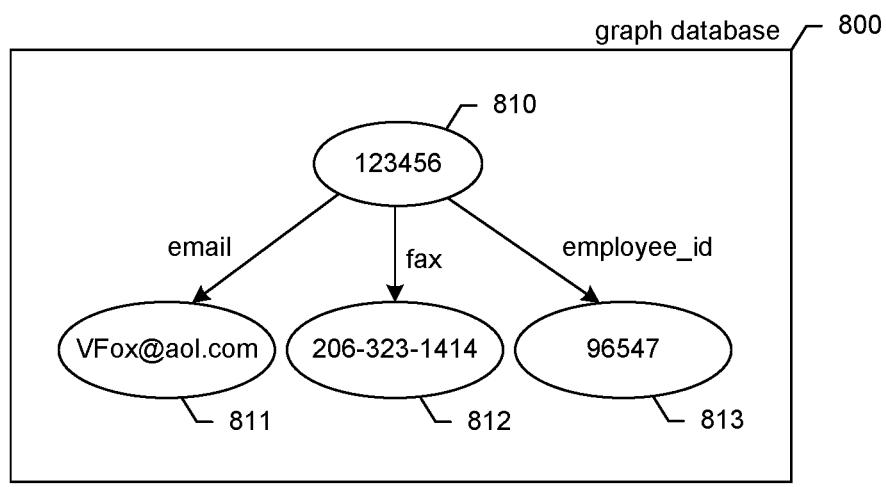
FIG. 8 is a graph diagram showing sample contents of the graph database in response to receiving request 3.

FIG. 8 is a graph diagram showing sample contents of the graph database in response to receiving request 3. The diagram shows that, in the graph database 800, a new property node 813 specifying the value "96547" for the employee_ID property has been added to the entity node 810 having the internal ID "123456".

FIG. 9 is a table diagram showing sample contents of the cross-reference table in response to receiving request 3. The facility has added a new row 902 to the cross-reference table 600 in response to receiving request 3. Row 902 indicates that entity node 810 shown in FIG. 8, identified by internal ID "123456", can also be identified by applications by the "96547" value of the employee_ID property.

Table 6 below shows a subsequent Get request by application B.

TABLE 6

Request 4: Get by Application B

Get
{
    employee_id: "96547"
}

This request illustrates that (1) entity node 810 can now be accessed using the value "96547" of the employee_ID IFP, and (2) this value of the employee_ID property is now returned for this entity node, in addition to the values of the email and fax properties.

Table 7 below shows the response to request 4.

TABLE 7

Response to Request 4

{
    id: "123456",
    email: "VFox@aol.com",
    fax: "206-323-1414",
    employee_id: "96547"
}

It can be seen that the response to request 4 shown in Table 7 differs from the response to request 2 shown in Table 4 only in the addition of a value of the employee_ID.

Table 8 below shows a subsequent Request by application A.

TABLE 8

Request 5: Get by Application A

Get
{
    email: "VFox@aol.com"
}

This request illustrates that (1) application A can continue to refer to entity node 810 using the value "VFox@aol.com" of the email IFP, and (2) the value of the employee_ID property added to this entity node by application B is now returned to application A.

TABLE 9

Response to Request 5

{
    id: "123456",
    email: "VFox@aol.com",
    fax: "206-323-1414",
    employee_id: "96547"
}

It can be seen that the response to request 5 by application A shown in Table 8 contains the same content as the response to request 4 by application B shown in Table 7.

Table 10 below shows a further update request by application A for a new entity.

TABLE 10

Request 6: Post by Application A

Post
{
    email: "Vinod@msn.com",
    fax: "312-444-6161"
}

The only IFP in this update request is a value for the email property that is not in cross-reference table 900 shown in FIG. 9. Accordingly, the facility creates a new entity node, to which it attaches the property values specified by the request.

Figure 10:
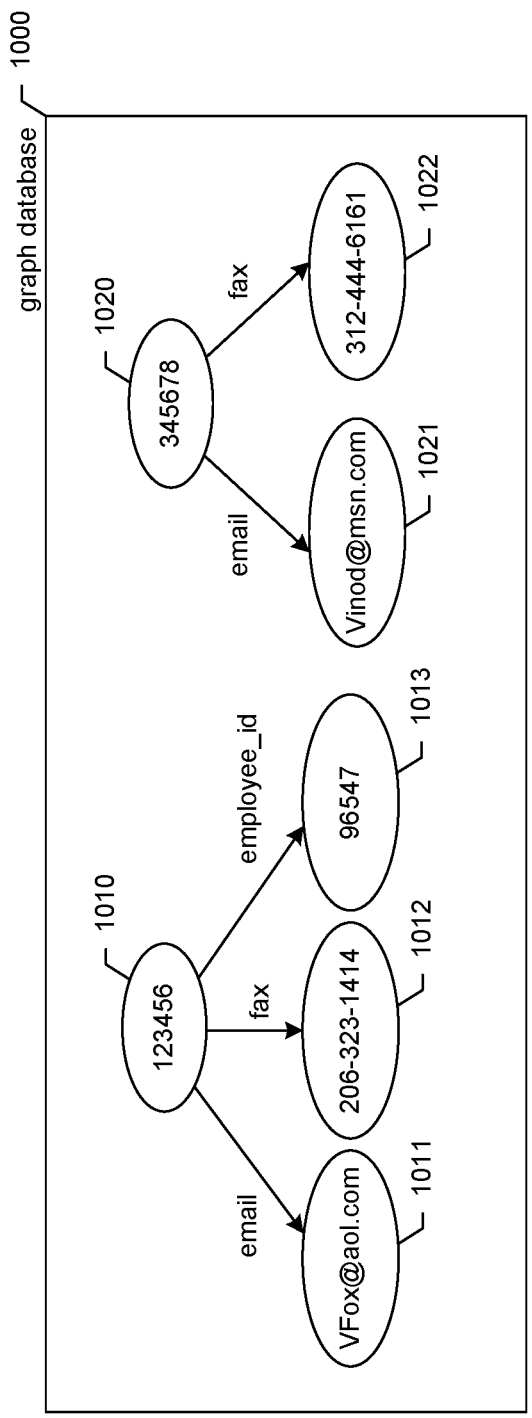
FIG. 10 is a graph diagram showing sample contents of the graph database in response to receiving request 6.

FIG. 10 is a graph diagram showing sample contents of the graph database in response to receiving request 6. The diagram shows that, in the graph database 1000, the facility has added a new entity node 1020 identified by the internal ID "345678". The new entity node has a property node 1021 specifying the value "Vinod@msn.com" for the email property, and a property node 1022 specifying the value "312-444-6161" for the fax property.

FIG. 11 is a table diagram showing sample contents of the cross-reference table in response to receiving request 6. The facility has added a new row 1103 to the cross-reference table 1100 in response to receiving request 6. Row 1103 indicates that entity node 1020 shown in FIG. 10, identified by internal ID "345678", can be identified by applications by the "Vinod@msn.com" value of the email property.

Table 11 below shows a further update request by application B.

TABLE 11

Request 7: Post by Application B

Post
{
　　employee_id: "71236",
　　allergy: "dairy"
}

Because the value of the only IFP in the request, employee_ID, it is not in cross-reference table 1100 shown in FIG. 11, the facility creates a new entity node to which to apply the update request.

Figure 12:
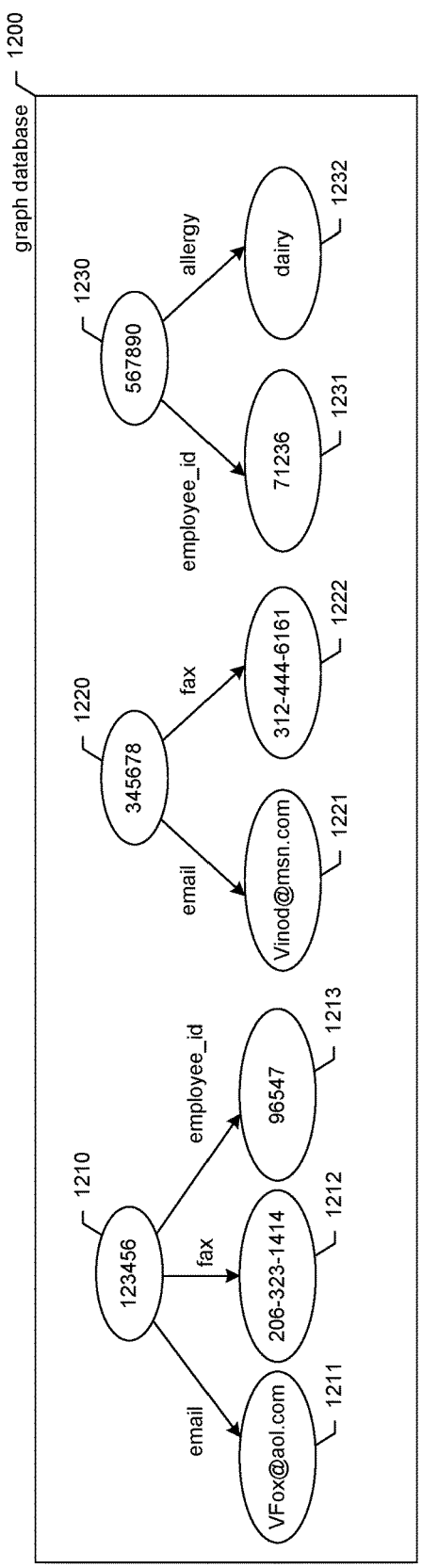
FIG. 12 is a graph diagram showing a sample graph sample contents of the graph database in response to receiving request 7.

FIG. 12 is a graph diagram showing a sample graph sample contents of the graph database in response to receiving request 7. It can be seen that, relative to the graph database contents 1000 shown in FIG. 10, the facility has added to the graph database contents 1200 new entity node 1230 identified by the internal ID "567890". This entity node has a property node 1231 specifying an employee_ID value of "71236", and a property node 1232 specifying an allergy value of "dairy".

FIG. 13 is a table diagram showing sample contents of the cross-reference table in response to receiving request 7. It can be seen that, relative to cross-reference table 1100 shown in FIG. 11, the facility has added row 1304, which maps from employee_ID value "71236" to internal ID "567890", which identifies entity 1230 shown in FIG. 12.

At this point, as illustrated by the responses to requests 8 and 9 below (These two requests are shown in Tables 12 and 14 below; the response to them are in Tables 13 and 15.), application A has created entity node 1220 which it can access through the email value "Vinod@MSN.com", while application B has created entity node 1230 which it can access through the employee_ID value "71236". These two entity nodes are not associated in the graph database in any way.

Table 12 below shows a Get request made by application A for the entity having the value "Vinod@MSN.com" for the email property.

TABLE 12

Request 8: Get by Application A

Get
{
　　email: "Vinod@msn.com"
}

Table 13 below shows the response to this Get request, transmitting the contents of nodes 1220-1222.

TABLE 13

Response to Request 8

{
　　id: "345678",
　　email: "Vinod@msn.com",
　　fax: "312-444-6161"
}

Table 14 below shows a Get request made by application B for the entity having the value "71236" for the employee_ID property.

TABLE 14

Request 9: Get by Application B

Get
{
　　employee_id: "71236"
}

Table 15 below shows the response to this Get request, transmitting the contents of nodes 1230-1232.

TABLE 15

Response to Request 9

{
　　id: "567890",
　　employee_id: "71236",
　　allergy: "dairy"
}

Table 16 below shows a further update request by application B.

TABLE 16

Request 10: Post by Application B

Post
{
　　employee_id: "71236",
　　email: "Vinod@msn.com"
}

Figure 14:
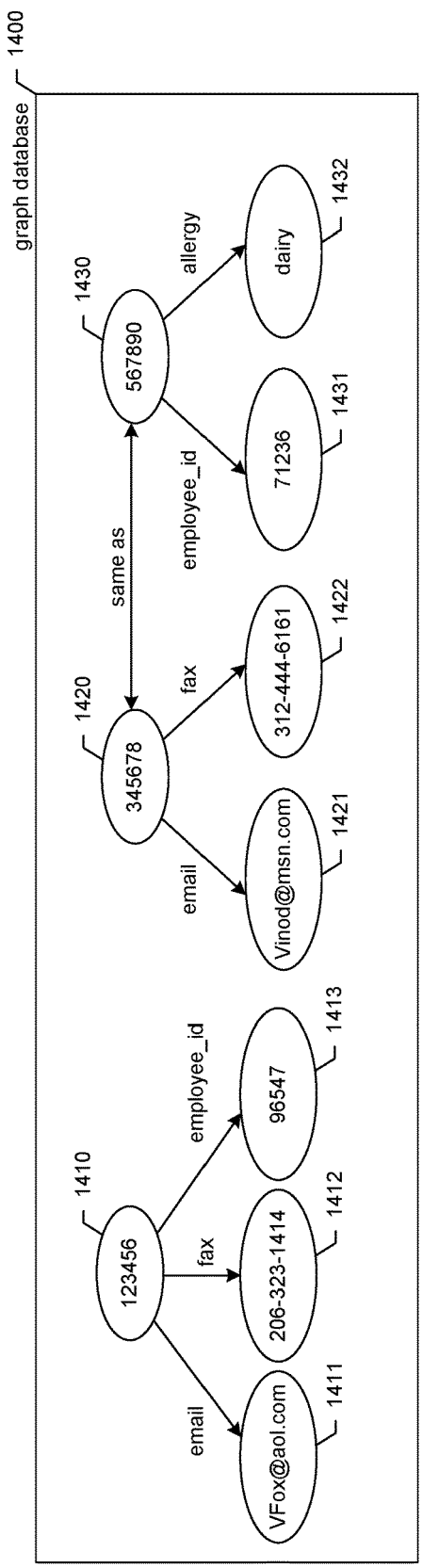
FIG. 14 is a graph diagram showing a first approach to entity node reconciliation performed by the facility in some embodiments in response to request 10.
Figure 15:
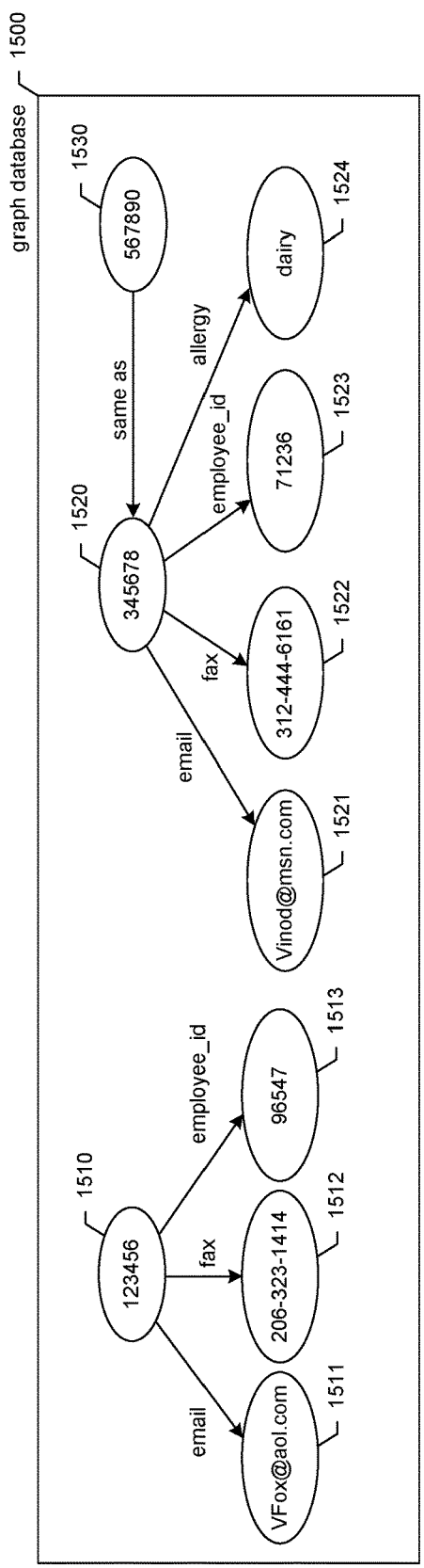
FIG. 15 is a graph diagram showing a second, alternate approach to entity node reconciliation performed by the facility in some embodiments in response to request 10.

This update request specifies that a single entity is identified by the employee ID value "71236" and the email value "Vinod@msn.com". When the facility looks up these two property values in cross-reference table 1300, it finds the first in row 1304, mapped to internal ID "567890", and the second in row 1303, mapped to a different internal ID, "345678". In response, the facility reconciles the two entity nodes having these internal IDs. In various embodiments, the facility takes various approaches to this reconciliation. FIGS. 14 and 15 show two available approaches to this reconciliation each used in some embodiments.

FIG. 14 is a graph diagram showing a first approach to entity node reconciliation performed by the facility in some embodiments in response to request 10. By comparing the graph database 1400 to graph database 1200 shown in FIG. 12, it can be seen that the facility has added a bidirectional "same as" edge between entity nodes 14209430 in response to request 10. This new bidirectional "same as" edge connotes that each of the two entity nodes it connects has property nodes that relate to the other. Where the facility pursues this approach to reconciliation, it includes logic that, when accessing the properties in any entity node, checks for the presence of "same as" edges connecting the entity node to other entity nodes; where it finds one or more, it also accesses the properties of the other entity nodes connected to the entity node by a "same as" edge.

FIG. 15 is a graph diagram showing a second, alternate approach to entity node reconciliation performed by the facility in some embodiments in response to request 10. By comparing the graph database 1500 to graph database 100 shown in FIG. 12, it can be seen that the facility has done the following in response to request 10: shifted property nodes 1231 and 1232 from entity node 1230 to entity node 1520 (After the shift, these two property rights are numbered as 1523 and 1524.); and added a unidirectional "same as" edge from entity node 1530 to entity node 1520. At this point, entity node 1520 possesses all of the properties earlier stored for itself or entity node 1530, and will continue to do so. Accesses to this merged entity using internal ID "345678" will proceed normally. Where the facility pursues this approach to first reconciliation, it includes logic that, when accessing an entity node, checks for the presence of an outbound "same as" edge connecting the entity node to another entity node. Where it finds one, it redirects the access from the entity node that is the source of the edge to the entity node that is the target of the edge.

FIG. 16 is a table diagram showing sample contents of the cross-reference table in response to request 10 where the facility pursues the second, "entity node merging" approach to entity node reconciliation, as shown in FIG. 15. By comparing cross-reference table 1600 to cross-reference table 1300 shown in FIG. 13, it can be seen that the facility has transformed row 1304 intro 1604, changing the "Vinod@msn.com" value of the email property that formerly mapped to internal ID "567890" to instead be mapped to internal ID "345678". As a result, future update or Get requests that identify an entity using this value of the email property will proceed directly to entity node 1520 which has the internal ID "345678", and will not need to traverse the "same as" edge from entity node 1530 to entity node 1520. The facility has also added row 1605 to the cross-reference table, which maps from the internal ID "567890" to the internal ID "345678". As a result, in some embodiments, future update or Get requests that identify an entity using the internal ID "567890" will proceed directly to entity node 1520 having the internal ID "345678", and will not have to traverse the "same as" edge from entity node 1530 to entity node 1520.

Tables 17-20 below and their discussions are based on the facility pursuing the second, "energy node merging" approach to entity node reconciliation reflected by FIGS. 15 and 16.

Table 17 below shows a subsequent Get request by application A, seeking the contents of the entity identified by the value "Vinod@msn.com" of the email property.

TABLE 17

| Request 11: Get by Application A |
|---|
| Get<br>{<br>    email: "Vinod@msn.com"<br>} |

This request matches row 1603 Of the Cross-Reference Table 1600 Shown in FIG. 16. This row contains the internal ID "345678"; accordingly, the facility access in entity node 1520 shown in FIG. 15 having this internal ID, and returns this internal ID and the values of the property nodes 1521-1524, as shown in the response contained in Table 18 below.

TABLE 18

| Response to Request 11 |
|---|
| {<br>    id: "345678",<br>    email: "Vinod@msn.com",<br>    fax: "312-444-6161",<br>    employee_id: "71236",<br>    allergy: "dairy"<br>} |

Table 19 below shows a Get request by application B, seeking the contents of the entity identified by the value "71236" of the employee_ID property.

TABLE 19

| Request 12: Get by Application B |
|---|
| Get<br>{<br>    employee_id: "71236"<br>} |

This request matches row 1604 of the cross-reference table 1600 shown in FIG. 16. This row contains the internal ID "345678"; accordingly, the facility access in entity node 1520 shown in FIG. 15 having this internal ID, and returns this internal ID and the values of the property nodes 1521-1524, as shown in the response contained in Table 20 below.

TABLE 20

| Response to Request 12 |
|---|
| {<br>    id: "345678",<br>    email: "Vinod@msn.com",<br>    fax: "312-444-6161",<br>    employee_id: "71236",<br>    allergy: "dairy"<br>} |

In some embodiments, the facility receives a single Post request specifying attribute values for multiple database nodes. In processing such Post requests, in some embodiments, the facility reconciles two or more such nodes into the same entity. In a first example, the IFP table contains a single IFP, and the facility receives a single Post request specifying property values for two different database nodes, such that the same value of the single IFP is specified for both of the database nodes. In the first example, the facility performs entity reconciliation by creating a single entity node having the specified value of the IFP, and all of the other specified property values. In a second example, the IFP table contains two IFPs, and the facility receives a single Post request specifying property values for three different database nodes: a first node, for which a first value is specified for the first IFP; a second node, for which a second value is specified for the second IFP; and a third node, for which the first value is specified for the first IFP and the second value is specified for the second IFP. In the second example, the facility performs entity reconciliation by reconciling the third node with both the first node (based on the first IFP) and with the second node (based on the second IFP) to yield a single entity.

In some embodiments, the facility provides a computer-readable medium having contents configured to cause a computing system to perform a method for addressing nodes in a graph database, the method comprising: receiving from a first application a first indication that it treats a first property as a unique identifier; receiving from a second application distinct from the first application a second indication that it treats a second property distinct from the first property as a unique identifier; from the first application, receiving a first update request for a distinguished entity, the distinguished entity identified in the first update request by its value for the first property; performing the first update request with respect to the distinguished entity; from the second application, receiving a second update request for the distinguished entity, the distinguished entity identified in the second update request by its value for the second property; and performing the second update request with respect to the distinguished entity.

In some embodiments, the facility provides a method in a computing system for addressing nodes in a graph database, the method comprising: receiving from a first application a first indication that it treats a first property as a unique identifier; receiving from a second application distinct from the first application a second indication that it treats a second property distinct from the first property as a unique identifier; from the first application, receiving a first update request for a distinguished entity, the distinguished entity identified in the first update request by its value for the first property; performing the first update request with respect to the distinguished entity; from the second application, receiving a second update request for the distinguished entity, the distinguished entity identified in the second update request by its value for the second property; and performing the second update request with respect to the distinguished entity.

In some embodiments, the facility provides a method in a computing system, comprising: receiving a first post to a graph database specifying a first value for a first field and a second value for a second field; in response to receiving the first post: identifying among a list of identifier mappings for the graph database a first mapping that maps from the first value for the first field to a first internal identifier identifying an entity node of the graph database; attaching to the entity node identified by the first internal identifier an property node specifying the second value for the second field; receiving a second post to the graph database specifying the first value for the first field and a third value for a third field; and in response to receiving the second post: adding to the list of identifier mappings for the graph database a second mapping from the third value for the third field to the first internal identifier.

In some embodiments, the facility provides a computer-readable medium having contents configured to cause a computing system to perform a method for addressing nodes in a graph database, the method comprising: receiving a first post to a graph database specifying a first value for a first field and a second value for a second field; in response to receiving the first post: identifying among a list of identifier mappings for the graph database a first mapping that maps from the first value for the first field to a first internal identifier identifying an entity node of the graph database; attaching to the entity node identified by the first internal identifier an property node specifying the second value for the second field; receiving a second post to the graph database specifying the first value for the first field and a third value for a third field; and in response to receiving the second post: adding to the list of identifier mappings for the graph database a second mapping from the third value for the third field to the first internal identifier.

In some embodiments, the facility provides one or more instances of computer-readable media collectively storing an entity cross-reference data structure with respect to a graph database, the data structure comprising a plurality of entries, each entry comprising: information identifying a property employed in the database, the identified property having been declared by at least one application as a basis for uniquely identifying entities in the graph database; information identifying a value of the identified property possessed by an entity in the graph database; and an internal identifier used by the graph database to uniquely identify the entity that possesses the identified value of the identified property, such that the data structure is usable to transform a property declared by at least one application as a basis for uniquely identifying entities in the graph database and a value of that property into an internal identifier for an entity in the graph database having the value of the property.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computer-readable medium having contents configured to cause a computing system to perform a method for addressing nodes in a graph database, the method comprising:
    receiving from a first application a first indication that it treats a first property as a unique identifier;
    receiving from a second application distinct from the first application a second indication that it treats a second property distinct from the first property as a unique identifier;
    from the first application, receiving a first update request for a distinguished entity, the distinguished entity identified in the first update request by its value for the first property;
    in response to receiving the first update, determining that the distinguished entity is identified in the first update request by its value for the first property by accessing a stored mapping from (1) the identity of the first property and (2) the first update request's value for the first property to a distinguished internal identifier that identifies the distinguished entity;
    performing the first update request with respect to the distinguished entity;
    from the second application, receiving a second update request for the distinguished entity, the distinguished entity identified in the second update request by its value for the second property;
    in response to receiving the second update, determining that the distinguished entity is identified in the second update request by its value for the second property by accessing a stored mapping from (1) the identity of the second property and (2) the second update request's value for the second property to the distinguished internal identifier; and
    performing the second update request with respect to the distinguished entity.

2. The computer-readable medium of claim 1 wherein the second application is created at a time after the first update is received from the first application.

3. The computer-readable medium of claim 1, further comprising, in response to receiving the first and second indications, storing the first and second properties in a list of inverse functional properties.

4. The computer-readable medium of claim 1, further comprising:
    in response to the combination of receiving the first indication and the first update request, creating a mapping to an internal identifier for the distinguished entity from the combination of the first property and the first update request's value for the first property; and
    in response to the combination of receiving the second indication and the second update request, creating a mapping to the internal identifier for the distinguished entity from the combination of the second property and the second update request's value for the second property.

5. The computer-readable medium of claim 4, further comprising using the internal identifier for the distinguished entity to perform the first and second update request with respect to the distinguished entity.

6. A method in a computing system, comprising:
receiving a first post to a graph database specifying a first value for a first field and a second value for a second field;
in response to receiving the first post:
identifying among a list of identifier mappings for the graph database a first mapping that maps from the first value for the first field to a first internal identifier identifying an entity node of the graph database;
attaching to the entity node identified by the first internal identifier an property node specifying the second value for the second field;
receiving a second post to the graph database specifying the first value for the first field and a third value for a third field; and
in response to receiving the second post:
adding to the list of identifier mappings for the graph database a second mapping from the third value for the third field to the first internal identifier.

7. The method of claim 6 wherein the first post is received from a first application and the second post is received from a second application distinct from the first application.

8. The method of claim 7 wherein the second application is created after the first post is received from the first application.

9. The method of claim 6, further comprising:
receiving indications that the first field and third field are inverse functional properties; and
in response to receiving the indications, adding the first field and third field to a list of inverse properties used to maintain the list of the identifier mappings.

10. The method of claim 6, further comprising:
receiving a third post to the graph database specifying the third value for the third field and a fourth value for a fourth field;
in response to receiving the third post:
identifying among the list of identifier mappings for the graph database the second mapping that maps from the third value for the third field to the first internal identifier;
attaching to the entity node identified by the first internal identifier an property node specifying the fourth value for the fourth field.

11. The method of claim 6, further comprising:
receiving a third post to the graph database specifying a fourth value for a fourth field;
determining that (1) the third post does not specify any value for the first field for which a mapping exists and (2) the third post does not specify any value for the third field for which a mapping exists;
in response to receiving the third post and the determining:
creating a second entity node having a second internal identifier;
adding to the list of identifier mappings for the graph database a third mapping from the fourth value for the fourth field to the second internal identifier;

after creating the second entity node, receiving a fourth post to the graph database specifying the first value for the first field and the fourth value for the fourth field;
in response to receiving the fourth post, based on the first and third mappings mapping to different internal identifiers, reconciling the first and second entity nodes.

12. The method of claim 11, further comprising altering the third mapping to map to the first internal identifier.

13. The method of claim 11, further comprising connecting the first and second entity nodes with a "same as" edge.

14. The method of claim 13 wherein the first and second entity nodes are connected with a "same as" edge based on a selected one of multiple versions of a set of reconciliation rules, and wherein each application accessing the graph database can select one of the versions of the set of reconciliation rules to govern its accesses to the graph database.

15. One or more instances of computer-readable media collectively storing an entity cross-reference data structure with respect to a graph database, the data structure comprising a plurality of entries, each entry comprising:
information identifying a property employed in the database, the identified property having been declared by at least one application as a basis for uniquely identifying entities in the graph database;
information identifying a value of the identified property possessed by an entity in the graph database; and
an internal identifier used by the graph database to uniquely identify the entity that possesses the identified value of the identified property, such that the data structure is usable to transform a property declared by at least one application as a basis for uniquely identifying entities in the graph database and a value of that property into an internal identifier for an entity in the graph database having the value of the property.

16. The instances of computer-readable media of claim 15 wherein a distinguished one of the plurality of entries was created in response to receiving an update to the graph database specifying the property identified by information of the distinguished entry and the value identified by information of the distinguished entry.

17. The instances of computer-readable media of claim 15, the data structure further comprising a second plurality of entries, each entry of the second plurality comprising:
information identifying a property employed in the database that at least one application has declared as a basis for uniquely identifying entities in the graph database.

18. The instances of computer-readable media of claim 17 wherein a distinguished one of the plurality of entries was created in response to a combination of (1) receiving an update to the graph database specifying the property identified by information of the distinguished entry and the value identified by information of the distinguished entry and (2) the presence among the second plurality of entries of a selected entry reflecting that at least one application has identified the property identified by information of the distinguished entry as a basis for uniquely identifying entities in the graph database.

19. The instances of computer-readable media of claim 18 wherein the selected entry was created in response to receiving a declaration by an application that the property identified by information of the distinguished entry uniquely identifying entities in the graph database.

* * * * *